Patented June 24, 1947

2,422,826

UNITED STATES PATENT OFFICE 2,422,826

PRODUCTION OF PURE MERCAPTANS

Harry E. Drennan, Bartlesville, Okla., assignor to Phillips Petroleum Company, a corporation of Delaware No Drawing. Application September 1, 1944, Serial No. 552,375

5 Claims. (Cl. 260—609)

This invention relates to the preparation of substantially pure mercaptans. In one particular aspect, this invention relates to a process for the production of pure alkali metal mercaptides from an impure alkyl mercaptan-containing material, and the preparation of pure alkyl mercaptans therefrom. A specific modification of the invention relates to the treatment of alkyl mercaptans having from 1 to about 8 or 10 carbon atoms per molecule in admixture with neutral or inert organic liquids, such as hydrocarbons, to precipitate alkali metal mercaptides by reaction with concentrated aqueous solutions of alkali metal hydroxides, purification of impure mercaptides so formed, and recovery of alkyl mercaptans therefrom free from contamination by the hydrocarbon or other neutral organic liquid.

In the past, interest in the separation of mercaptans from hydrocarbon oils has been almost exclusively confined to petroleum distillates in which small concentrations of mercaptans are objectionable in the finished products. In general, the mercaptans are classed as undesirable impurities in petroleum products and various methods have been proposed for converting them into less objectionable sulfur compounds which are left in the hydrocarbon oils, or for removing them as a group from hydrocarbon oils. In view of the low mercaptan sulfur concentration in the various petroleum distillates, generally of the order of much less than 1 per cent, the removal of hydrocarbon-free mercaptans is ordinarily not attempted.

Recent developments in the synthetic rubber industry have created a demand for pure alkyl mercaptans, generally those having several carbon atoms per molecule. Extreme purity is required, and such purity has been difficult or impossible of attainment by ordinary methods. Mercaptans suitable for use in the polymerization and/or compounding of synthetic rubber are advantageously prepared by the catalytic addition of hydrogen sulfide to olefins. Complete conversion of the olefins is seldom obtained in a single pass through a reaction zone, and the crude mercaptan concentrate product resulting accordingly contains appreciable amounts of unreacted olefin hydrocarbons. This crude product usually contains from about 20 to about 60 weight per cent, or even more, of mercaptans, with the mercaptan sulfur content correspondingly ranging, in the case of $C_8$ to $C_{12}$ mercaptans, from 3 to 13 per cent, or more by weight. The application of vacuum fractional distillation to the separation of mercaptans from neutral oils may result in a suitable mercaptan product. However, certain difficulties involved in such separations make general use of this method not entirely satisfactory. The various solvent extraction processes known to the art are inadequate for the segregation and recovery of hydrocarbon-free mercaptans, particularly from concentrates having a high mercaptan content. The recovery of mercaptans from such concentrates by the conventional alkali metal mercaptide route presents operational difficulties, and the mercaptans so recovered are contaminated with residual impurities.

An important object of the present invention is to prepare pure mercaptans.

Another object is to recover pure alkyl mercaptans or their equivalents from admixture with organic liquids such as hydrocarbons, chlorinated hydrocarbons, and the like which are substantially inert under the conditions of treatment.

A further object is to recover mercaptans from mercaptan-hydrocarbon mixtures containing high percentages of mercaptans.

A further object is to effect the precipitation of alkali metal mercaptides in an improved manner.

Another object is to purify solid alkali metal mercaptides which are contaminated with residual oils, and to recover substantially pure mercaptans from the thus-purified mercaptides.

Still another object is to react olefins with hydrogen sulfide to form a reaction mixture comprising alkyl mercaptan products plus unreacted olefins, and to recover said mercaptan products therefrom free from contamination by said unreacted olefins.

Further objects and advantages of the invention will be apparent, to one skilled in the art, from the accompanying disclosure and discussion.

In a preferred and specific modification of my invention, a liquid mercaptan concentrate containing from 20 to 60 weight per cent alkyl mercaptans, the balance being essentially olefin hydrocarbons, is subjected to a treatment which comprises diluting the liquid mercaptan-hydrocarbon mixture with a low-boiling paraffin hydrocarbon liquid to a mercaptan content of between 10 and 20 weight per cent, intimately contacting the diluted material with an aqueous sodium hydroxide solution containing at least 50 weight per cent sodium hydroxide to precipitate the mercaptans as insoluble solid sodium mercaptides, separating the solid mercaptides from any excess aqueous solution and from the bulk of the liquid hydrocarbons, washing the thus separated solid mercaptides with a low-boiling paraffin hydrocarbon liquid to remove therefrom residual oil of higher boiling point than the washing liquid, the precipitating, separating, and washing steps being carried out in the absence of air, reacting the washed oil-free mercaptides at atmospheric temperatures with about ten times the stoichiometrically equivalent amount of water to hydrolyze the mercaptides, concentrating the resulting aqueous sodium hydroxide solution and reusing it in the process, and recovering as a product of the process substantially pure alkyl mercaptans so produced.

In carrying out my invention I ordinarily employ as raw material a crude mercaptan oil of relatively high mercaptan content as compared with ordinary sour petroleum distillates. The mercaptan content of such oils or concentrates may range from almost 100% down to 20 or 25%, and is generally between about 20 and about 60 weight per cent. Typical of such materials are the crude products of the addition of hydrogen sulfide to olefinic polymers, for example those obtained as described in the application of Walter A. Schulze, Serial No. 493,463, filed July 3, 1943, or the applications of Walter A. Schulze and Willie W. Crouch, Serial Nos. 506,902, 506,903 and 506,904, filed October 19, 1943.

The mercaptan concentrate from such sources, or any other suitable source, is treated with a strong aqueous alkali metal hydroxide solution to effect precipitation of the mercaptans as alkali metal mercaptides. This precipitation is suitably carried out at temperatures ranging from the solidification point of the metal hydroxide solution up to say 125° F. or somewhat higher. The solid alkali metal mercaptides formed are substantially insoluble in the remaining oil and in the aqueous solution, and may be separated therefrom by filtration, centrifuging, or other suitable physical means. These solid mercaptides have been found invariably to contain some neutral oil which is adsorbed or otherwise mixed with the solid. In accordance with one aspect of the present invention, I subject the separated solid mercaptides to a washing treatment with a solvent in which the mercaptide is substantially insoluble and which has a boiling point different from, and preferably lower than, the boiling point of the residual oil impurity with which the mercaptides are contaminated. As a solvent I prefer to use a low-boiling hydrocarbon solvent, especially low-boiling paraffins, such as propane, butane, pentane and the like. The washing is best effected at relatively low temperatures, such as atmospheric or sub-atmospheric temperatures, to minimize solution of mercaptide in solvent. After washing with an amount of solvent adequate to remove the residual oil substantially completely, the remaining solvent is removed from the solid mercaptides by suitable means preferably by contacting the washed precipitate with a warm inert gas such as methane, nitrogen or the like, or by heating and/or reduction of pressure to evaporate the residual solvent. Any of these methods may be used advantageously at atmospheric temperatures on up to say about 200° F. In this manner, alkali metal mercaptide is obtained of a purity not heretofore obtainable. The thus-purified mercaptide may be usable per se, for example as a modifier in polymerizations leading to the production of synthetic rubbers, or may be used as the source of a pure mercaptan product to be used as modifier or in any other use in which purity is important or essential. In case a low molecular weight mercaptan is being separated from an oil of similar boiling range, I may use as my liquid for washing the mercaptide a hydrocarbon or other solvent of higher boiling point. Residual solvent may then be present with the mercaptan recovered by hydrolysis of the washed mercaptide, and is readily removed by distilling off the mercaptan from the residual higher-boiling solvent.

When the mercaptan content of the crude mercaptan-oil mixture exceeds about 20% by weight, a voluminous precipitate forms upon addition of the alkali metal hydroxide solution which renders contacting of the solution and the unreacted mercaptan-oil mixture difficult. I have found, however, that such difficulties may be avoided by adding a light hydrocarbon oil diluent, preferably that used in the subsequent washing of the precipitate, in an amount sufficient to give an oil containing between about 10 and 20 weight per cent mercaptan prior to precipitation of the mercaptide, and this dilution is accordingly a preferred step in my process.

Inasmuch as the production of especially pure product is an important object of this invention, I prefer to carry out the steps of precipitation, filtration and washing of the mercaptide precipitate in the absence of air in order to prevent any oxidation of the mercaptide or mercaptan with subsequent contamination of the mercaptan with undesired materials, and this also is an aspect of my invention in preferred form.

In the preparation of the pure mercaptides as just described I prefer to use as precipitating agent a strong aqueous solution of an alkali metal hydroxide, preferably one having a concentration of alkali metal hydroxide of at least 40 weight per cent or higher, while those containing at least 50 weight per cent are the most effective. The solution is best saturated with the hydroxide at the operating temperature, and may advantageously have present an excess of solid, undissolved metal hydroxide. Hydroxides of any of the alkali metals, namely, hydroxides of lithium, sodium, potassium, rubidium or cesium, may be used, but sodium and potassium hydroxides are ordinarily the most readily available and in some ways the most effective. The use of so-called "solutizers," such as alcohols, while adding in the desired salt formation, is ordinarily to be avoided in the present process on account of the enhanced solubility of the mercaptides in the aqueous solution. The solid mercaptides are precipitated by contacting the crude mercaptan oil and the strong aqueous alkali solution in any suitable manner and the precipitate thus formed is separated by conventional procedures known to the art. Mercaptans of not more than 8 to 10 carbon atoms per molecule form crystalline mercaptides which are relatively insoluble and easily separated from the oil and aqueous solution by filtration. Heavier mercaptides are more soluble, and any mercaptides in excess of the solubility which may be formed is likely to be an amorphous and gummy solid or semi-solid difficult to handle. The structure of the mercaptan is important in determining the solubility of its mercaptan; for instance tertiary dodecyl mercaptan made by reaction of triisobutylene with hydrogen sulfide cannot be readily precipitated even with concentrated sodium hydroxide solutions, while primary dodecyl mercaptan immediately forms a crystalline precipitate upon contact with caustic solutions of even moderate strength. Many alkenyl mercaptans, some aromatic mercaptans (thiophenols), and many alkyl mercaptans containing one or more substituent groups, such as halogen, hydroxy, etc., inert under the conditions of use, also form solid mercaptides. The present invention is applicable to purifying any mercaptans capable of forming solid metal mercaptides. The solid mercaptides formed by precipitation carry down appreciable quantities of neutral oils, for instance unreacted polymers, and sometimes heavier mercaptans which have not been precipitated or have been only incompletely precipitated, which materials contaminate the mercaptans subsequently formed from the mercaptides. It is to remove these contaminants that I employ the washing step described above, thereby forming pure mercaptides.

In order to recover the desired pure mercaptans from the mercaptides prepared and purified as described above, the latter are decomposed in any desired manner, for example by steam distillation, reaction with aqueous acids, etc. Preferably, however, water is added in effective amounts at suitable conditions, for instance at temperatures from below ordinary atmospheric temperatures on up to about 200° F., thereby resulting in the hydrolysis of the mercaptides and liberation of the mercaptans together with formation of an aqueous solution of the alkali metal hydroxide. I generally prefer to use approximately ten times the amount of water stoichiometrically equivalent to the mercaptide, thereby obtaining a purer product and a more concentrated alkaline solution than those obtained with a larger excess of the water, and avoiding mechanical and chemical difficulties encountered when using less water. The optimum quantity of water required for complete hydrolysis of the mercaptide depends upon the molecular weight of the mercaptan to be treated, and the lower the molecular weight, the larger the amount of water required per unit weight of mercaptide of a given alkali metal. For example, for $C_4$ sodium mercaptides, 100 pounds of water for 66 pounds of mercaptide is preferred for hydrolysis, while $C_8$ sodium mercaptides require a weight of water substantially equal to the weight of the mercaptide. These quantities ordinarily give complete hydrolysis, and a caustic solution of about 22% strength results. The amount required for any other mercaptide or mixture of mercaptides is readily calculated by one skilled in the art. After the hydrolysis is complete the pure mercaptan product, which is free from any residual oil, is separated from the aqueous layer and is immediately ready for any desired use, particularly those uses in which high purity is important or essential. The mercaptan may occasionally contain a trace of dissolved mercaptide, but this is seldom considered as an undesirable impurity. The amount present is ordinarily so small as to be almost undetectable. In any event, it is simply removed if desired by a wash with water, weak acid, or by distillation or flashing of the mercaptan. The aqueous solution formed in the hydrolysis is treated to evaporate sufficient water to give an alkali metal hydroxide solution of the required concentration, such as above 50%. This concentrated solution is then returned to the process for reuse in reacting with additional quantities of mercaptans.

The process of the present invention is especially directed toward the recovery of mercaptans from relatively concentrated solutions in hydrocarbons or other inert organic liquids, as distinguished over the low mercaptan concentrations of sour petroleum distillates. However, oils containing relatively low concentrations of mercaptans may be treated in accordance with the principles of the invention with suitable modifications. The minimum concentration for effective treating is governed by the molecular weight of the mercaptan. In general, the lower the molecular weight the lower the minimum concentration from which mercaptans can be precipitated by alkaline solutions. Using sodium hydroxide, for methyl mercaptan the mercaptan sulfur concentration may be as low as 0.01 weight per cent, for $C_4$ mercaptans 0.1 weight per cent, for $C_8$ tertiary mercaptans 0.3 weight per cent and for $C_{12}$ tertiary mercaptans about 3.4 weight per cent. In other words, these percentages represent the concentration of mercaptan sulfur in a hydrocarbon oil in contact with their respective sodium mercaptides at equilibrium at about 80° F. Ordinarily, hydrocarbon-mercaptan blends having mercaptan contents ranging from about 5 to 75 per cent by weight can be profitably treated for the recovery of pure mercaptans by my process, but the most economically favorable concentrations are those of about 20 to 60 or more per cent based on RSH assay or from about 3 to about 13 or more per cent based on mercaptan sulfur content. The invention is especially applicable to crude mercaptan oils or concentrates containing olefinic hydrocarbons, due to the fact that various other possible methods of purification are interfered with by the olefins or are entirely inapplicable because of the presence of olefins. The hydrogen sulfide-free crude product of the catalytic addition of hydrogen sulfide to olefin polymers, in which incomplete conversion of the polymers is attained in a once-through operation, is an important example of the type of material to which my purification process is most advantageously applied.

As examples of my invention, the following data are given but it will be understood that these are exemplary only and not to be construed as unduly limiting the invention.

*Example 1*

A mercaptan-hydrocarbon sample containing 29.8 per cent mercaptan sulfur by weight was prepared by mixing 84 ml. of butyl mercaptan and 16 ml. of octene. The sample was diluted with 400 ml. of n-pentane and treated with 33.3 ml. of aqueous alkali solution containing 53 per cent sodium hydroxide by weight. The heavy precipitate was vacuum filtered in the absence of air, washed with two 300 ml. portions of n-pentane, and filtered. Dry nitrogen was subsequently drawn through the precipitate until it was thoroughly dry. A 20 gram sample of the thus-purified butyl mercaptide was hydrolyzed with 30 ml. of water, and about 16 ml. of butyl mercaptan was recovered which tested 35.2 weight per cent mercaptan sulfur. The recovered butyl mercaptan was substantially pure.

*Example 2*

A sample containing 5.3 weight per cent sulfur was prepared by mixing 24 ml. of octyl mercaptan with 65 ml. of octene. The mixture was diluted with an equal volume of n-pentane and contacted with 12 ml. of 56 per cent aqueous potassium hydroxide. The heavy precipitate was vacuum filtered in the absence of air until no more oil could be removed. The precipitate was then washed with two 200 ml. portions of n-pentane, filtered, and dried by a stream of methane while the temperature was maintained at 106° F. A portion of the purified C$_8$ mercaptide was then hydrolyzed with 20 ml. of water and about 10 ml. of C$_8$ mercaptan was separated from the aqueous solution. Analysis of the purified mercaptan showed 21.8 weight per cent sulfur. The octyl mercaptan recovered was substantially pure.

As indicated above, the low molecular weight mercaptides are practically insoluble in liquid hydrocarbons, while the higher molecular weight mercaptides, such as C$_8$ and higher, when in contact with hydrocarbon liquids permit substantial amounts of mercaptide and/or mercaptan to go into or remain in solution in the liquid. Accordingly, in applying the process of my invention to the purification of higher molecular weight mercaptans, I have found that by including in the wash liquid an amount of mercaptan at least equal to the amount which is present therein when such liquid is in equilibrium with excess alkali metal mercaptide at the washing temperature, I may wash the mercaptide to be purified without incurring any loss thereof by solution in the wash liquid. For example, if a C$_{12}$ tertiary mercaptan is being separated from a crude mercaptan product, and pentane is to be used as the wash liquid for purifying the solid or semi-solid sodium mercaptide, I prefer to dissolve in the pentane prior to contacting it with the mercaptide a sufficient amount of pure C$_{12}$ tertiary mercaptan or the mercaptide thereof to produce a wash liquid containing at least about 3.5 weight per cent mercaptan sulfur. The washing step subsequently carried out then involves no loss of mercaptide by solution in the wash liquid. Any mercaptan remaining on the mercaptide after evaporation or other removal of the wash liquid is of course not considered an impurity, and is recovered along with the mercaptan product upon hydrolysis of the purified mercaptide. Similar results are obtained by reusing the wash liquid two or more times, or by continuously recycling the wash liquid to the mercaptide washing step, so that the first contact of wash liquid with mercaptide effects solution of the equilibrium amount of mercaptide and/or mercaptan, while subsequent contacts cause no solution. The wash liquid may be reused a number of times before it is necessary to purify it by removal of heavy oils, the extent to which the heavy oil content may be allowed to build up being dependent on the desired purity of the final mercaptide or mercaptan product.

The term "essentially a non-solvent" and similar terms as used herein and in the appended claims refers to any wash liquid which can be used to wash a solid mercaptide without causing complete solution thereof. It is thus seen that some solution of mercaptide in wash liquid may occur, while still obtaining the advantages of the invention; it is preferred, however, to minimize such solution by inclusion of mercaptan in the wash liquid as just described.

While I have described my invention in detail with the inclusion of certain specific embodiments, no undue limitations as to the scope of the invention are intended except as imposed by the claims.

I claim:

1. In the preparation of pure mercaptans by the catalytic addition of hydrogen sulfide to olefin polymers, the improved method of separating pure mercaptan product from unreacted olefin polymer which comprises contacting a crude mercaptan concentrate containing alkyl mercaptan and unreacted olefin polymer with a substantially saturated solution of alkali metal hydroxide in water under conditions effecting the precipitation of solid alkali metal mercaptide, separating said mercaptide from excess solution of alkali metal hydroxide and from the bulk of said unreacted olefin polymer, washing the thus-separated mercaptide with a hydrocarbon wash liquid which is essentially a non-solvent for said mercaptide and which is lower boiling than said unreacted olefin polymer to remove residual amounts of the latter from said mercaptide, dissolving in said wash liquid prior to washing said mercaptide therewith sufficient of said mercaptan in substantially pure form to substantially minimize solution of said mercaptide normally occurring therein, passing a hot inert oxygen-free gas in intimate contact with the thus-washed mercaptide to volatilize therefrom residual wash liquid, contacting the thus-purified mercaptide with about ten times the stoichiometrically equivalent amount of water to hydrolyze said mercaptide and thereby forming alkyl mercaptan and an aqueous solution of alkali metal hydroxide, and separating the pure alkyl mercaptan so produced.

2. A method for the recovery of pure alkyl mercaptans having from one to ten carbon atoms per molecule from an admixture thereof with olefinic hydrocarbons, said admixture containing from 20 to 60 weight per cent alkyl mercaptans, which comprises diluting said admixture with a low-boiling paraffin hydrocarbon liquid to a mercaptan content of between 10 and 20 weight per cent, intimately contacting the resulting diluted admixture with an aqueous sodium hydroxide solution containing at least 50 weight per cent sodium hydroxide in the absence of air and under conditions effecting precipitation of said mercaptans as insoluble solid sodium mercaptides, separating said solid mercaptides from the liquids in the absence of air, washing the thus-separated mercaptides in the absence of air with a low-boiling paraffin hydrocarbon liquid to remove therefrom residual oil of higher boiling point than said low-boiling paraffin hydrocarbon liquid, dissolving in said wash liquid prior to washing said mercaptide therewith sufficient of said mercaptan in substantially pure form to substantially minimize solution of said mercaptide normally occurring therein, evaporating residual low-boiling paraffin hydrocarbon wash liquid from said solid mercaptides at temperatures up to 200° F., contacting the thus-purified mercaptides at temperatures up to 200° F. with about ten times the stoichiometrically equivalent amount of water to hydrolyze said mercaptides, thereby forming alkyl mercaptans and an aqueous solution of sodium hydroxide, reconcentrating said solution to a sodium hydroxide content of at least 50 weight per cent and reusing same to precipitate additional quantities of mercaptans, and recovering pure alkyl mercaptans so produced.

3. The method of claim 5 in which said hydrocarbon wash liquid is lower boiling than said residual neutral organic liquid, and in which residual wash liquid is evaporated from said solid mercaptide prior to said hydrolyzing step.

4. The method of claim 5 in which said hydrocarbon wash liquid is higher boiling than said residual neutral organic liquid and said mercaptan, and in which the mercaptan recovered by hydrolysis is distilled away from residual wash liquid and thus recovered in substantially pure form.

5. A method for the recovery of substantially pure solid-alkali-metal-mercaptide-forming mercaptan from mixtures of the same with neutral organic liquids, which comprises intimately contacting such a mixture with an aqueous solution of an alkali metal hydroxide of sufficient strength and under conditions adequate to effect precipitation of solid alkali metal mercaptide, separating said solid mercaptide from the liquids, washing the thus separated mercaptide with a hydrocarbon wash liquid having a boiling range different from residual neutral organic liquid associated with said mercaptide and under conditions and in quantities such as normally to cause partial but incomplete solution of said mercaptide therein, dissolving in said wash liquid prior to washing said mercaptide therewith sufficient of said mercaptan in substantially pure form to substantially minimize solution of said mercaptide normally occurring therein, and hydrolyzing the thus-washed mercaptide to recover therefrom mercaptan uncontaminated with any of the neutral organic liquid originally associated therewith in said mixture.

HARRY E. DRENNAN.

REFERENCES CITED

The following references are of record in the file of this patent:

UNITED STATES PATENTS

| Number | Name | Date |
|---|---|---|
| 2,110,412 | Yabroff | Mar. 8, 1938 |
| 2,222,170 | Craig | Nov. 19, 1940 |
| 2,164,665 | Rogers | July 4, 1939 |
| 2,094,612 | Malisoff | Oct. 5, 1937 |
| 2,045,766 | Frolich | June 30, 1936 |
| 2,183,968 | McCormick et al. | Dec. 19, 1939 |
| 2,013,203 | Davis | Sept. 3, 1935 |
| 2,245,317 | Bannerot | June 10, 1941 |

OTHER REFERENCES

Borgstrom et al., "Jour. Am. Chem. Soc.," vol. 51, pp. 3649–51.

Wertheim, "Jour. Am. Chem. Soc.," vol. 51, pp. 3661–64. (Copy of Journals in Scientific Library.)

Certificate of Correction

Patent No. 2,422,826.

June 24, 1947.

HARRY E. DRENNAN

It is hereby certified that errors appear in the printed specification of the above numbered patent requiring correction as follows: Column 4, line 49, for "adding" read *aiding*; column 8, lines 33 and 34, claim 2, for "mercaptant" read *mercaptan*; and that the said Letters Patent should be read with these corrections therein that the same may conform to the record of the case in the Patent Office.

Signed and sealed this 12th day of August, A. D. 1947.

[SEAL]

LESLIE FRAZER,
*First Assistant Commissioner of Patents.*